United States Patent Office 2,766,897
Patented Oct. 16, 1956

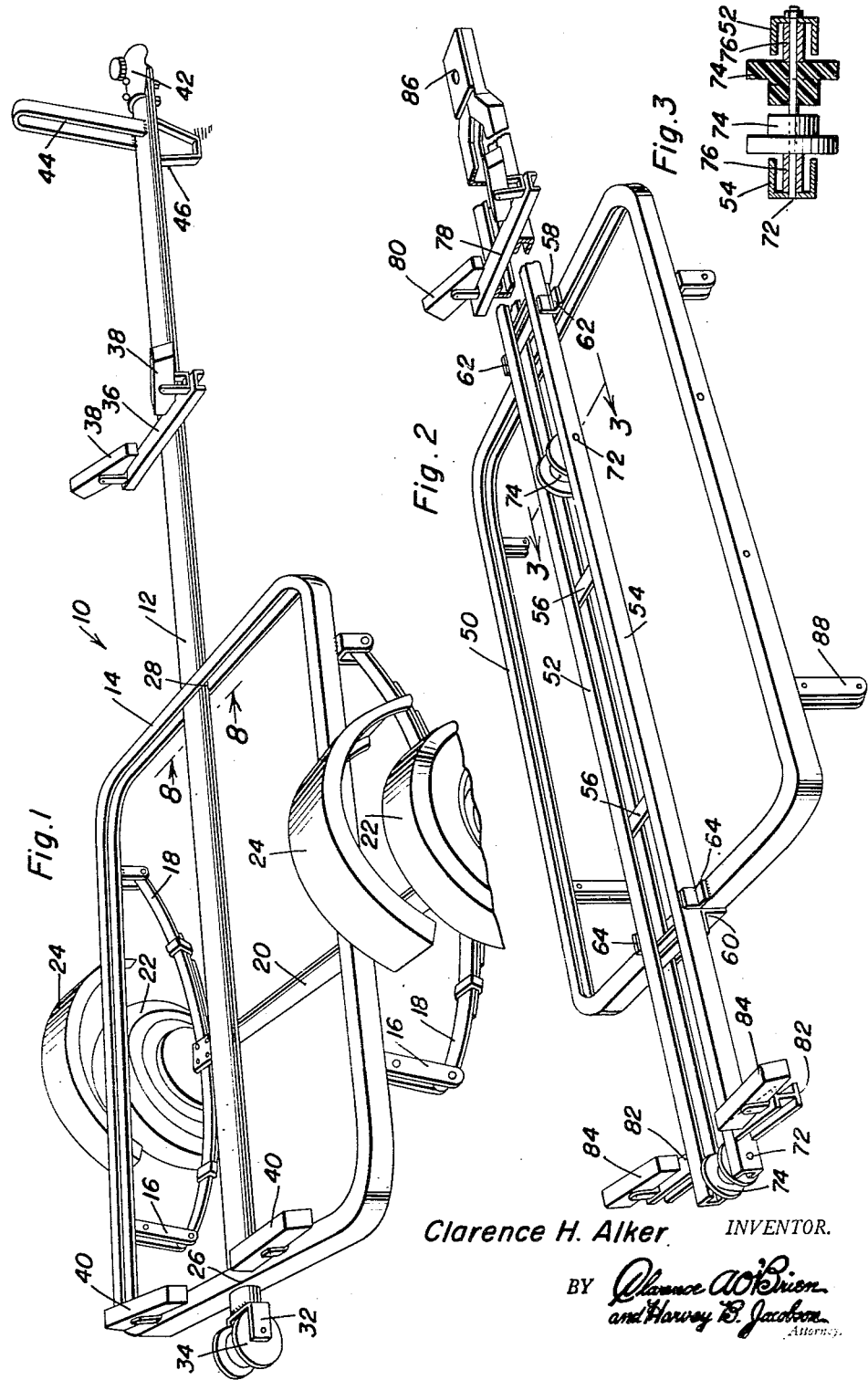

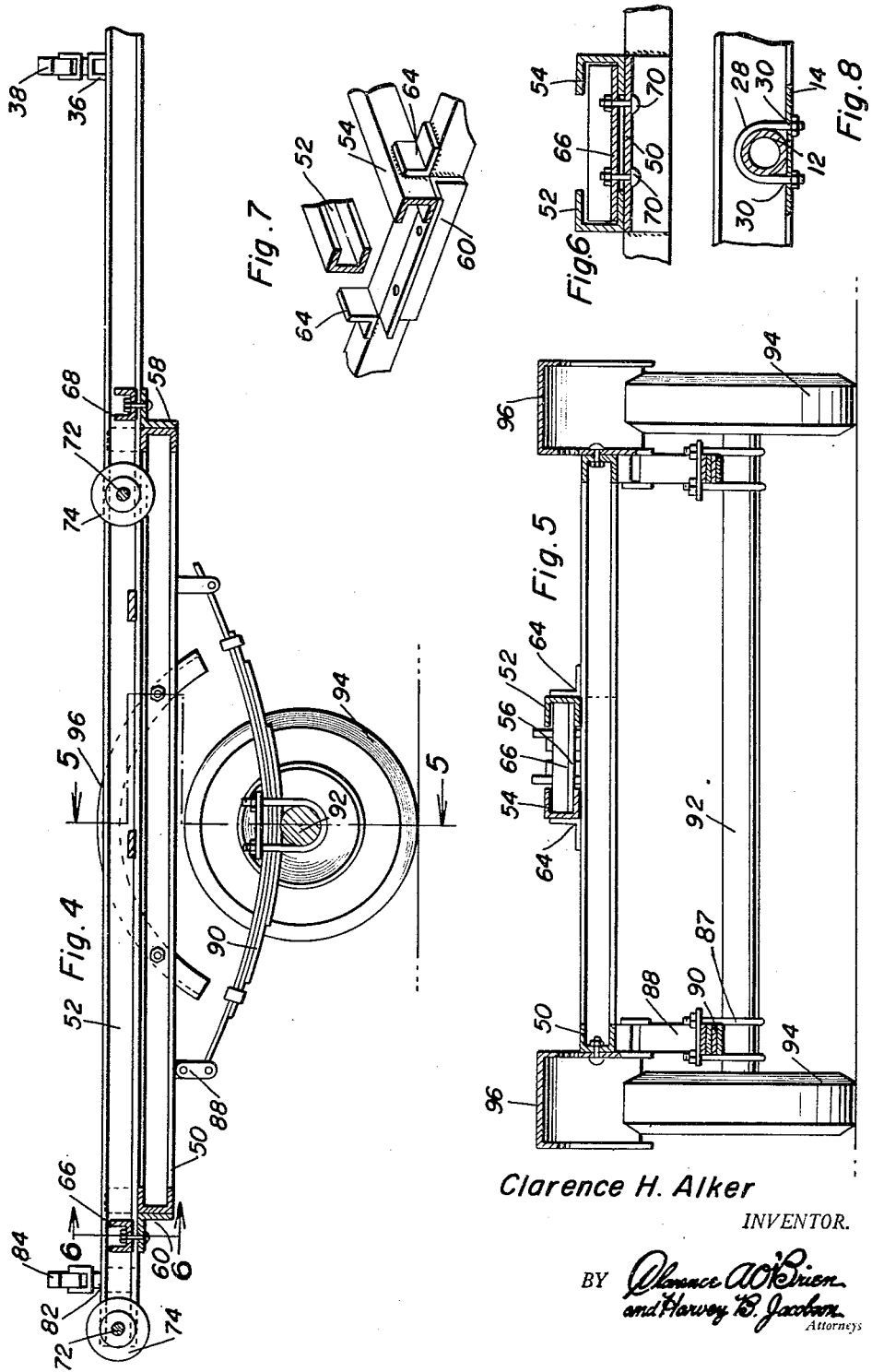

2,766,897

BOAT TRAILER CONSTRUCTION

Clarence H. Alker, New Orleans, La.

Application November 10, 1954, Serial No. 467,989

1 Claim. (Cl. 214—84)

This invention relates to the class of vehicles and more particularly to a novel boat trailer construction.

The primary object of the present invention resides in the provision of a boat trailer including a wheeled frame having a boat supporting tongue adjustably mounted thereon, which wheeled frame is longitudinally adjustable relative to the tongue to adjust the balance of the boat with respect to the trailer and thus position the center of gravity of the boat preferably directly over the axle on which the wheels of the frame are mounted.

Many boat owners are now attaching comparatively large and powerful engines to their boats which have incorporated for use in conjunction with the motor batteries and automatic starting apparatus. These motors and the additional apparatus are usually kept permanently installed on the boat, and since the motor and auxiliary equipment is comparatively heavy, the center of gravity of the boat with the motor attached is often shifted remote from the center point of the boat and from the center of gravity of the boat without the motor and auxiliaries attached. A boat trailer embodying the concept of the present invention provides means for supporting the boat on a tongue while allowing the frame which carries the axle and wheels to be moved longitudinally with respect to the tongue and therefore with respect to the boat, thereby allowing the wheels to be placed directly under the center of gravity, even after the boat has been positioned on the supporting tongue.

A further object of the invention resides in the provision of a trailer of a construction whereby a supporting tongue may be moved longitudinally with respect to the wheeled frame of the trailer to thereby enable the wheels to be positioned relative to the other parts of the trailer in position so that the axle is in position at the estimated center of gravity of the boat.

The construction of this invention further features novel clamp means for adjustably clampingly holding the tongue whether of tubular or rectangular channel construction in an adjustable manner relative to the frame.

Still further objects and features of this invention reside in the provision of a boat trailer that is strong and durable, simple in construction and manufacture, which can be easily used to launch and raise boats from the water, yet which is comparatively inexpensive to produce, thereby permitting wide distribution and utilization.

These, together with the various ancillary objects and features of the invention which will become apparent as the following description proceeds, are attained by this boat trailer construction, preferred embodiments of which have been illustrated in the accompanying drawing, by way of example only, wherein:

Figure 1 is a perspective view of one form of boat trailer construction employing a tubular tongue;

Figure 2 is a perspective view of another form of the trailer employing a rectangular tongue formed of channel-shaped members;

Figure 3 is a vertical sectional view as taken along the plane of line 3—3 in Figure 2 and showing the construction of the roller chock assembly in detail;

Figure 4 is a longitudinal sectional view of the boat trailer employing the rectangular tongue;

Figure 5 is a vertical sectional view as taken along the plane of line 5—5 in Figure 4;

Figure 6 is a sectional detail view as taken along the plane of line 6—6 in Figure 4 and illustrating the means for clampingly holding the tongue to the frame;

Figure 7 is a partial perspective view of the clamping means used for holding the tongue to the frame; and Figure 8 is a sectional detail view as taken along the plane of line 8—8 in Figure 1, illustrating the clamping means for holding the tubular tongue to the frame.

With continuing reference to the accompanying drawings, wherein like reference numerals designate similar parts throughout the various views, and with initial attention directed to the embodiment of the invention as is shown in Figures 1 and 8, it will be noted that this embodiment of the invention is generally designated by reference numeral 10 and includes an elongated tubular tongue 12 which is mounted for adjustable relationship relative to a substantially rectangular frame 14.

The frame 14 is preferably of channel construction and includes downwardly extending brackets, as at 16, which carry leaf springs 18 supporting the axle 20 on which a pair of wheels 22 are mounted. Fenders either directly attached to the frame 14 or riveted to brackets or otherwise secured to the frame 14 are provided and are designated by reference numeral 24.

The tongue 12 may be suitably clamped to the frame 14 in any desired manner, and in the embodiment shown in Figure 1, the tubular tongue 12 extends through apertures, as at 26, in the frame, with the tongue 12 being longitudinally adjustable with respect to the frame 14 and being held in its selected position by means of U-bolts 28 which overlie the tongue 12 and extend through apertures 30 in the lower flange member of the channel-shaped frame 14. It is to be understood that a pair of U-shaped bolts 28 are utilized, one at the forward end of the frame and the other at the rear portion of the frame where the tongue 12 passes therethrough.

Welded or otherwise attached to the tongue 12 is a substantially U-shaped bracket 32 which carries rollers 34 having both a chock and a movable support for a boat when such is placed on the trailer. A cross-bar 36 is secured to the tongue 12 and carries pivotally mounted self-adjusting rail support members 38 to form a cradle for the boat for supporting the boat directly on the tongue 12. Another cross-bar similar to the cross-bar 36 can be provided at the rear end of the tongue 12 or, if desired, the cradle support members 40 can be directly mounted on the frame 14 in lieu of on the tongue 12. This is, of course, optional, and it is generally highly desirable to mount the cradle support members, as at 40, directly on the tongue 12. In use, by loosening the U-bolts 28, the tongue 12 can be adjusted relative to the frame 14 to a position where the axle 20 is under the estimated position of the center of gravity of the boat when the boat is placed on the boat trailer 10. After the boat has been lifted onto the trailer, and with the boat being mainly supported by the cradle members on the tongue 12, the wheeled frame 14 can be moved longitudinally with respect to the tongue 12 to thereby position the axle 20 and hence the wheels 22 which support the weight of the boat directly underneath the center of gravity of the boat, thereby assuring that the boat will remain stable and be best supported during the transportation thereof.

Of course, a suitable hitch 42 as well as a winch support 44 and a stand 46 may be provided for the trailer 10, as desired.

Referring now to the embodiment of the invention as is shown in Figures 2 through 7, it will be noticed that the frame 50 carries a tongue formed of a pair of channel members 52 and 54, the flanges of which face each other. The channel members 52 and 54 are preferably joined together by means of straps or bars 56. Welded or otherwise attached to the front and rear portions of the frame 50 are angle-shaped supports 58 and 60. Also welded or otherwise attached to the frame 50 are pairs of forward and rear angle guides 62 and 64, respectively, against which the webs of the channel-shaped members 52 and 54 are adapted to abut. The channel members 52 and 54 are adjustably held in position on the angle support members 58 and 60 by means of plates 66 and 68, preferably of channel shape, and which clampingly engage the lower flanges of the channel members 52 and 54 between the channel plates 66 and 68 and the upper flange of the channel-shaped frame 50. By loosening the fasteners 70 extending through the aligned apertures in the plates 66 and 68 and the frame 50, the tongue formed by the channel members 52 and 54 may be moved longitudinally with respect to the frame 50.

Carried on shaft 72 extending between the channel members 52 and 54 are pairs of rollers 74 preferably formed of a suitable resilient material and which are held from the channel members 52 and 54 by means of spacers 76. These rollers 74 form roller chocks for supporting the keel of a boat, and it is noted that a cross-bar 78 can be provided on which self-adjusting pivotally mounted support members 80 are mounted. Alternatively, cross-bars, as at 82, can be secured to the webs of the channel members 52 and 54 and can pivotally adjustably carry the support members 84. Suitable hitching means 86 can be provided for the front end of the tongue formed by the channel members 52 and 54, and a shackle 87 and a bracket 88 are provided for mounting the springs 90 carrying the axle 92 on which the wheels 94 are mounted. Suitable fenders 96 may be attached in any desired fashion to the frame 50 or to brackets affixed to the frame.

In use, the tongue formed by the channel members 52 and 54 is adjusted with respect to the frame 50 according to the estimated center of gravity of the boat. Then, after the boat has been placed upon the tongue, the wheeled frame 50 can be longitudinally adjusted with respect to the boat and hence to its center of gravity by loosening the fasteners 70 and sliding the frame 50 with respect to the tongue. Then, the fasteners 70 can be again tightened as desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A boat trailer comprising a wheeled frame, a tongue adjustably secured to said frame, said tongue being wholly longitudinally adjustable with respect to said frame, said tongue comprising a pair of spaced channel members, and clamp means engaging said channel members and extending therebetween holding said tongue in its adjusted relationship on said frame, said clamp means including a plate, and fasteners extending through said plate and said frame clampingly holding said plate on said channel members, shafts extending between said channel members, roller guides carried by said shafts, cross-bars secured to said channel members, and cradles carried by said cross-bars.

References Cited in the file of this patent

UNITED STATES PATENTS

| | | |
|---|---|---|
| 1,804,089 | Cochran | May 5, 1931 |
| 2,174,063 | Richards | Sept. 26, 1939 |
| 2,196,338 | McDaniel | Apr. 9, 1940 |
| 2,377,399 | Brumfield | June 5, 1945 |
| 2,636,745 | Cartwright | Apr. 28, 1953 |
| 2,691,534 | Sampsell | Oct. 12, 1954 |
| 2,708,045 | Shontz | May 10, 1955 |
| 2,717,707 | Martin | Sept. 13, 1955 |

FOREIGN PATENTS

| | | |
|---|---|---|
| 726,877 | France | Mar. 14, 1932 |